(12) United States Patent
Treadway

(10) Patent No.: US 10,884,864 B2
(45) Date of Patent: Jan. 5, 2021

(54) AUTONOMOUS SELF-HEALING STATELESS MICROSERVICE NODES

(71) Applicant: INTERNATIONAL BUSINESS MACHINES CORPORATION, Armonk, NY (US)

(72) Inventor: Michael Treadway, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/204,609

(22) Filed: Nov. 29, 2018

(65) Prior Publication Data

US 2020/0174888 A1 Jun. 4, 2020

(51) Int. Cl.
*G06F 11/14* (2006.01)
*G06F 11/07* (2006.01)

(52) U.S. Cl.
CPC ...... *G06F 11/1441* (2013.01); *G06F 11/0757* (2013.01); *G06F 11/1438* (2013.01); *G06F 2201/805* (2013.01); *G06F 2201/82* (2013.01)

(58) Field of Classification Search
CPC ............. G06F 11/0751; G06F 11/0721; G06F 11/0709; G06F 11/0757; G06F 11/14; G06F 11/144; G06F 11/1441; G06F 11/1438
See application file for complete search history.

(56) References Cited

U.S. PATENT DOCUMENTS

| 7,293,201 | B2 | 11/2007 | Ansari |
| 2004/0066741 | A1 | 4/2004 | Dinker et al. |
| 2010/0042820 | A1* | 2/2010 | Clemm ............... G06F 11/3409 713/2 |
| 2011/0225467 | A1 | 9/2011 | Betzler et al. |

(Continued)

FOREIGN PATENT DOCUMENTS

| CN | 103595572 A | 2/2014 |
| CN | 105933448 A | 9/2016 |

(Continued)

OTHER PUBLICATIONS

Florio et al., "Gru: An Approach to Introduce Decentralized Autonomic Behavior in Microservices Architectures", 2016 IEEE International Conference on Autonomic Computing (ICAC), Jul. 17-22, 2016, 1 page.

(Continued)

*Primary Examiner* — Matthew M Kim
*Assistant Examiner* — Kurosu Risa Altaf
(74) *Attorney, Agent, or Firm* — Brian Restauro; Andrew D. Wright; Roberts Calderon Safran & Cole, P.C.

(57) ABSTRACT

A computer-implemented method includes: randomly generating, by a process running on a computer device, a reset time for the process; broadcasting a message to other processes in a cluster, the message including the reset time; entering a running state; receiving another message from one of the processes, the other message including another reset time; comparing the other reset time to the reset time;

(Continued)

and in response to the comparing, the process performs one of: continuing in the running state based on the other reset time being different than the reset time; and randomly generating a new reset time for the process based on the other reset time coinciding with the reset time.

20 Claims, 6 Drawing Sheets

(56) References Cited

U.S. PATENT DOCUMENTS

| | | | |
|---|---|---|---|
| 2014/0101419 A1* | 4/2014 | Giddi | G06F 11/0742 713/1 |
| 2017/0046146 A1 | 2/2017 | Jamjoom et al. | |
| 2017/0329588 A1 | 11/2017 | Lundberg et al. | |

FOREIGN PATENT DOCUMENTS

| | | |
|---|---|---|
| JP | 2007529067 A | 10/2007 |
| WO | 2018019242 | 2/2018 |

OTHER PUBLICATIONS

Mell et al., "The NIST Definition of Cloud Computing", NIST, Special Publication 800-145, Sep. 2011, 7 pages.

* cited by examiner

AUTONOMOUS SELF-HEALING STATELESS MICROSERVICE NODES

BACKGROUND

The present invention relates generally to systems and methods to prevent failure of a service in a software architecture, and more particularly, to systems and methods to randomly reset individual processes running in a cluster without disrupting the process running on the overall cluster.

Networks such as those relied on in HTTP web services typically include a plurality of microservice nodes organized by service clusters. A plurality of microservice nodes within the same service cluster perform the same function or service, and provide redundancy to the requested service so as to avoid failure of the entire service when one microservice node fails. In particular, stateless nodes can self-heal by being reset, or shut down and subsequently turned back on.

SUMMARY

In an aspect of the invention, there is a computer-implemented method including: randomly generating, by a process running on a computer device, a reset time for the process; broadcasting, by the process, a message to other processes in a cluster, the message including the reset time; entering, by the process, a running state; receiving, by the process, another message from one of the processes, the other message including another reset time; comparing, by the process, the other reset time to the reset time; and in response to the comparing, the process performs one of: continuing in the running state based on the other reset time being different than the reset time; and randomly generating a new reset time for the process based on the other reset time coinciding with the reset time.

In another aspect of the invention, there is a computer program product including a computer readable storage medium having program instructions embodied therewith. The program instructions are executable by a computer device to cause a process running on the computer device to: randomly generate a reset time for the process; broadcast a message to other processes in a cluster, the message including the reset time; enter a running state; receive another message from one of the processes, the other message including another reset time; compare the other reset time to the reset time; and in response to the comparing, causing the computer device to one of: continue in the running state based on the other reset time being different than the reset time; and randomly generate a new reset time for the process based on the other reset time coinciding with the reset time.

In another aspect of the invention, there is a system including a processor, a computer readable memory, and a computer readable storage medium. The system includes: program instructions to randomly generate a reset time for a process; program instructions to broadcast a message to other processes in a cluster, the message including the reset time; program instructions to enter a running state; program instructions to receive another message from one of the processes, the other message including another reset time; program instructions to compare the other reset time to the reset time; and program instructions to, in response to the comparing, causing the process to one of: continue in the running state based on the other reset time being different than the reset time; randomly generate a new reset time for the process based on the other reset time coinciding with the reset time. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
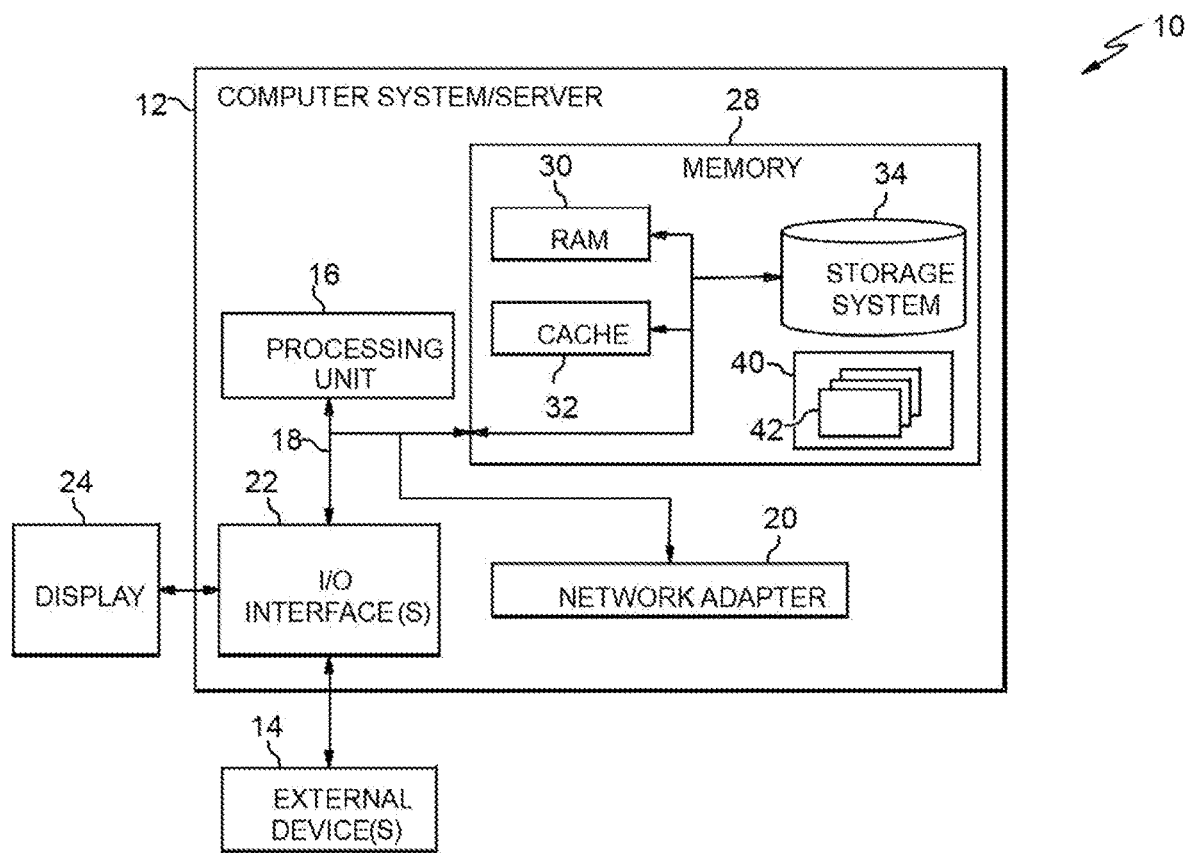
FIG. 1 depicts a cloud computing node according to an embodiment of the present invention.

The present invention relates generally to systems and methods to prevent failure of a service in a software architecture, and more particularly, to systems and methods to randomly reset individual processes running in a cluster without disrupting the process running on the overall cluster. Computer networks are typically vulnerable to degradation of performance or failure because of memory leaks, file handle leaks, unexpected uses that lead to compromised threads or processes, and the like. When the processes are stateless processes, the failing processes are typically reset, which includes turning down the process and subsequently turning the process back on, in order to maintain the quality of service (QoS) for users of the network. Typically, network operators attempt to predict the failure of a network by reviewing specific performance metrics of the service provided by the network, resource utilization metrics, and/or the number of times the service has been reset over a given period of time. However, such predictive methodology is costly and time consuming, and is susceptible to false positives, typically struggles to account for usage spikes, and cannot predict whether resetting a given service may result in the shutdown of the whole service cluster.

As such, aspects of the invention provide a method for avoiding or reducing the most common reasons for failure of a computer network which include, for example, memory leaks, file handle leaks, or other failures that typically degrade QoS but that can be restored by a reset, or shutdown/restart cycle, of the service. In embodiments, a process, among a plurality of processes that are part of the same service cluster, i.e., that perform the same function, sets a reset time to undergo a reset procedure, which includes a shutdown procedure followed by a turning back on procedure. As a result, the process resets, i.e., self-heals, and degradation of performance or failure of the service cluster and of the overall computer network may be avoided or reduced. In embodiments, the reset times for resetting individual processes are broadcast by each process via a one-way datagram, irrespectively of whether other processes may also broadcast their reset time. In this manner, network traffic is limited, and the processes independently reset, i.e., self-heal, within a same service cluster. In embodiments, the reset times for each process are set via a randomizing algorithm.

In embodiments, if a first process receives a one-way datagram from a second process, the one-way datagram including the reset time of the second process, and if the reset time of the second process coincides with the reset time of the first process, then the first process does not reset and instead determines and broadcasts a new reset time. In embodiments, reset times are considered to coincide with each other if they are within a predefined amount of time. In embodiments, the predefined amount of time includes the time necessary for a process to terminate the operation currently running, and to shut down.

Embodiments of the invention improve the technology of network management by randomly scheduling reset, i.e., self-healing procedures on individual processes within a same service cluster. Embodiments of the invention employ an unconventional arrangement of steps including: randomly generating a reset time for the process; broadcasting a message to other processes in a cluster, the message including the reset time; entering a running state; receiving another message from one of the processes, the other message including another reset time; comparing the other reset time to the reset time; and in response to the comparing, the process performs one of: continuing in the running state based on the other reset time being different than the reset time; and randomly generating a new reset time for the process based on the other reset time coinciding with the reset time. The steps themselves are unconventional, and the combination of the steps is also unconventional. For example, the step of randomly generating a reset time for a process creates new information that does not exist in the system, and this new data is then used in subsequent steps in an unconventional manner. Embodiments of the invention also utilize elements and/or techniques that are necessarily rooted in computer technology, including a method of self-healing processes while avoiding system failure due to a computer network failure.

Embodiments provide a computer-implemented method including configuring nodes within a web service cluster to automatically put each respective node into a respective state; self-healing each of the configured nodes preemptively according to a randomized algorithm that assumes services failures in a way that maintains zero down time for the web service cluster. Self-healing each of the configured nodes preemptively according to a randomized algorithm that assumes services failures in a way that maintains zero down time for the web service cluster comprises a communication algorithm consisting of a single one-way datagram.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
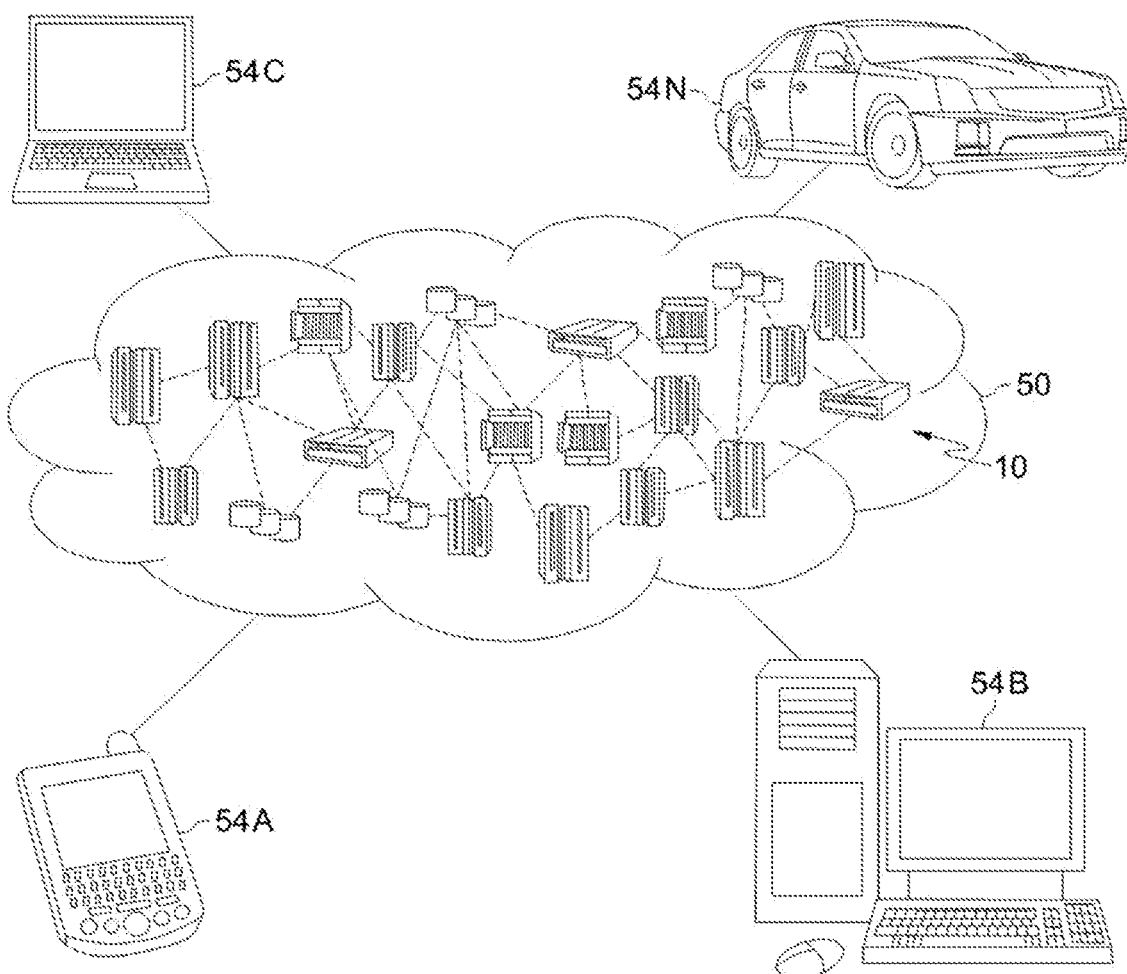
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
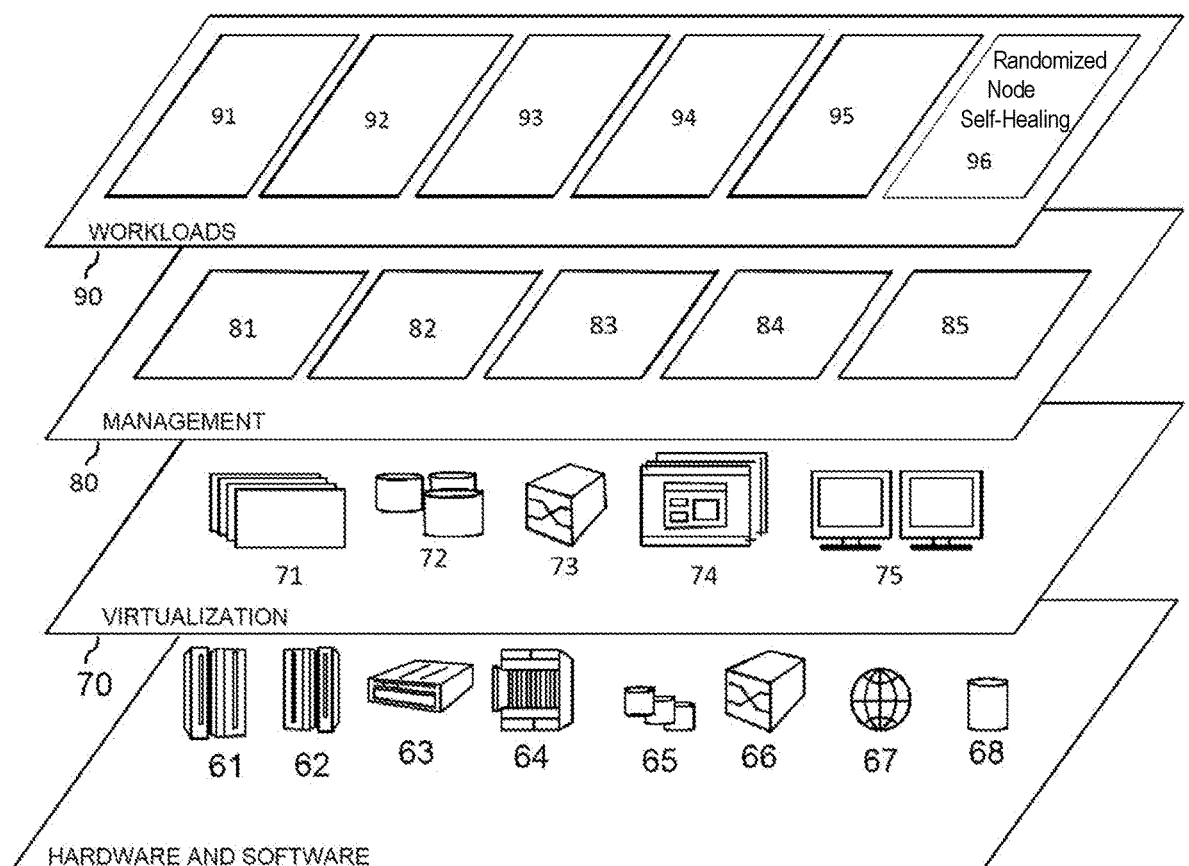
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and randomized node self-healing 96.

Implementations of the invention may include a computer system/server 12 of FIG. 1 in which one or more of the program modules 42 are configured to perform (or cause the computer system/server 12 to perform) one of more functions of the randomized node self-healing 96 of FIG. 3. For example, the one or more of the program modules 42 may be configured to: schedule a first self-healing procedure of a first network node within a service cluster, the first network node being one of a plurality of network nodes within the service cluster, the first self-healing procedure being scheduled for a first time; and to schedule a second self-healing procedure for a second network node, the second network node being another one of the plurality of network nodes within the service cluster, the second self-healing procedure being scheduled for a second time different from the first time. The first self-healing procedure and the second self-healing procedure are scheduled according to a randomized algorithm.

Figure 4:
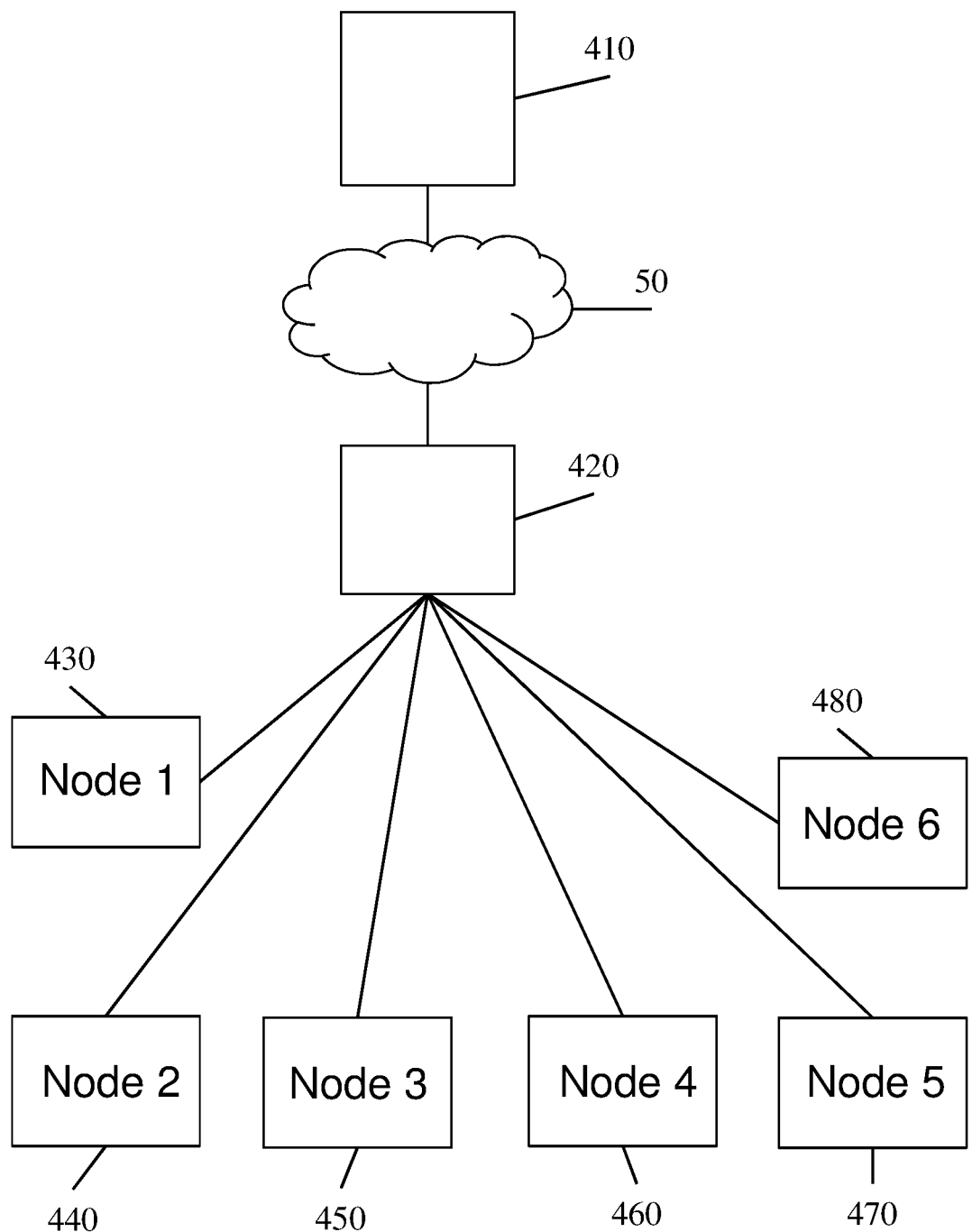
FIG. 4 shows a block diagram of an exemplary environment and method in accordance with aspects of the invention.

FIG. 4 shows a block diagram of an exemplary environment and method in accordance with aspects of the invention. In embodiments, the environment includes a cloud computing environment such as the cloud computing environment 50 illustrated in FIG. 2, and a plurality of network nodes, such as the cloud computing node 10 illustrated in FIG. 2. In embodiments, the environment includes a client device 410 operatively coupled to a microservice cluster, such as a web service cluster, via the cloud computing environment 50. Specifically, the client device 410 is operatively coupled to a load balancing node 420 via the cloud computing environment 50, and the load balancing node 420 is coupled to a plurality of nodes 430, 440, 450, 460, 470 and 480. In embodiments, the load balancing node 420 routes network packets to individual nodes from the nodes 430, 440, 450, 460, 470 and 480 based on, for example, relative activity of each of the nodes, and distributes network traffic among the multiple nodes 430, 440, 450, 460, 470 and 480 within the cluster to avoid overloading any one of the nodes and improve performance of the computing environment.

In embodiments, each of the nodes 430, 440, 450, 460, 470 and 480 runs one or more instances of a process, such as a microservice. In embodiments, plural instances of the same process are grouped in a service cluster and share a same service key ("SERVICE_KEY"). Aspects of the invention are directed to self-healing individual ones of the processes in a service cluster in such a way as to maintain zero down time for the cluster as a whole. In embodiments, each of the nodes 420, 430, 440, 450, 460, 470 and 480 include one or more components of the cloud computing node 10 illustrated in FIG. 1. In embodiments, the client device 410 includes one or more components of the computer system/server 12 illustrated in FIG. 1.

Figure 5:
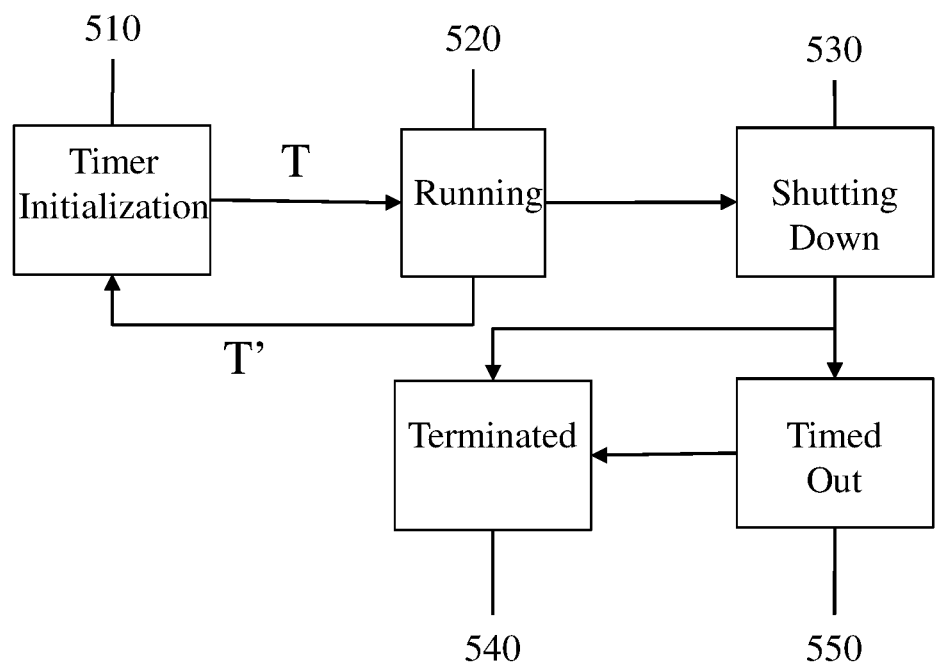
FIG. 5 shows a state diagram of an exemplary environment and method in accordance with aspects of the invention.

FIG. 5 shows a state diagram of one of the processes running on one of the nodes 430, 440, 450, 460, 470 and 480 in accordance with aspects of the invention. In embodiments, the timer initialization state 510 ("TIMER_INIT") is a state in which the process determines a reset time T for performing its reset (e.g., self-healing operation). In embodiments, the TIMER_INIT is a state where the service process determines the time epoch and schedules a timer to transition the process into the SHUTTING_DOWN state, the SHUTTING_DOWN being further discussed below. In embodiments, the reset time T is the time at which the reset of the process is scheduled to take place, and a one-way datagram is broadcast to all the processes within the same service cluster. In embodiments, the one-way datagram includes the reset time T and the service key ("SERVICE_KEY"), which identifies the microservice cluster that includes the process to be reset. In embodiments, the process determines the reset time T via a randomizing algorithm.

In embodiments, the running state 520 ("RUNNING") is a state in which the process is running and accepting connections until the reset time T is reached, at which point the process transitions to a shutting down state 530 ("SHUTTING_DOWN"). In embodiments, the SHUTTING_DOWN state is a state where the service process is no longer accepting new connections and is waiting for existing connections to terminate. According to aspects of the invention, while the process is in the running state, if that process receives a datagram from another process in the same service cluster and that datagram indicates a reset time T' that equals T (where equal refers to two times T and T' being separated by less than a minimum amount of seconds referred to as PADDING), then the process returns to the timer initialization state to determine a new reset time T. In embodiments, the PADDING is the minimum amount of seconds between the declared recycle time of another process and the recycle time of the current process. In implementations, the times T and T' are defined relative to an epoch time, although other routines may be used.

In embodiments, the shutting down state 530 is a state in which the process shuts down. In embodiments, the terminated state 540 ("TERMINATED") is a state in which the service process has terminated, and the process closes all connections during the shutdown procedure. In embodiments, the timed-out state 550 ("TIMED_OUT") is a state in which the service process has exceeded the TIME_OUT configuration parameter, which is the maximum amount of time the process will wait for connections to terminate. Accordingly, in the timed-out state 550, the process is automatically transitioned to the TERMINATED state.

Figure 6:
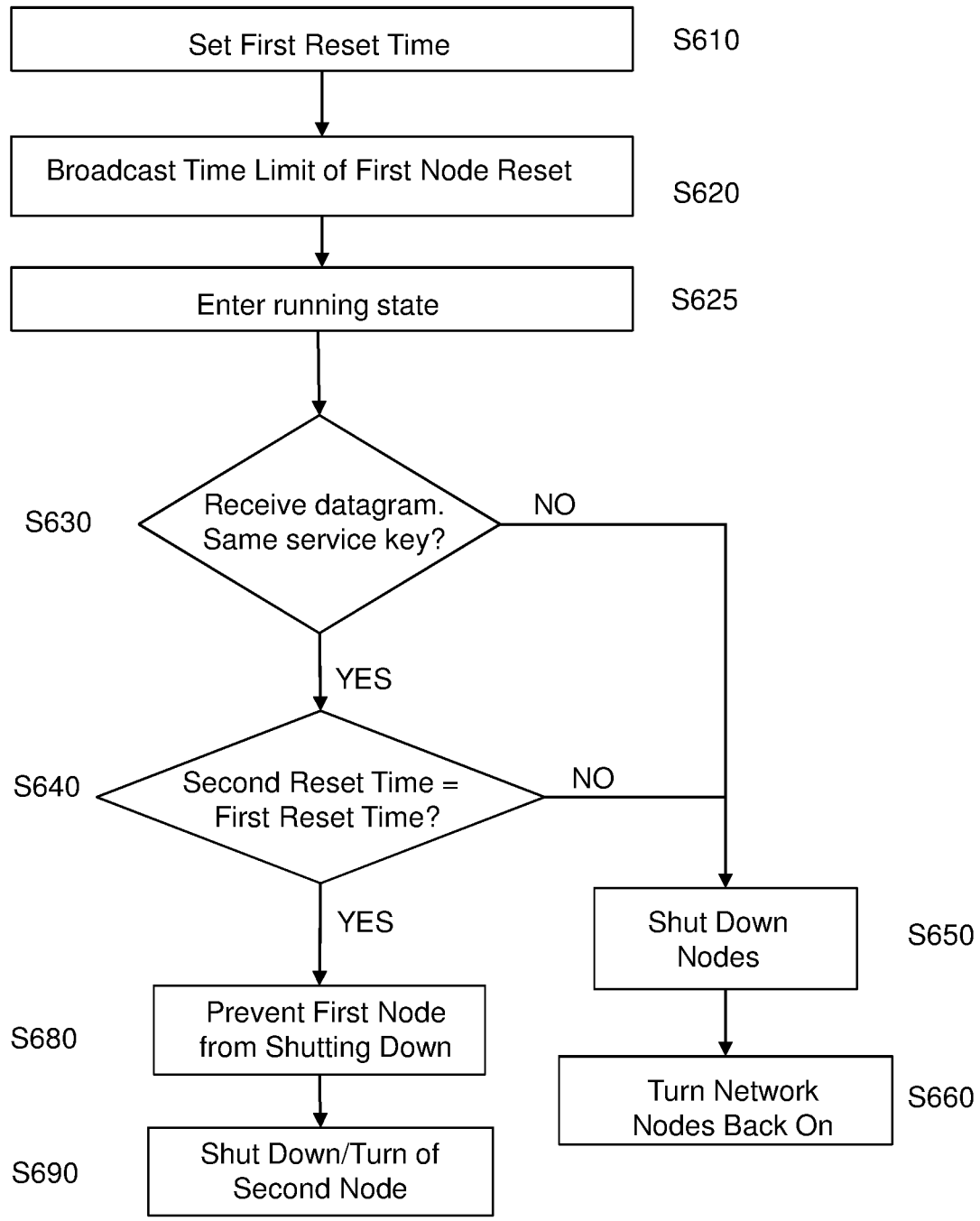
FIG. 6 shows a flowchart of an exemplary method in accordance with aspects of the invention.

FIG. 6 shows a flowchart of an exemplary method in accordance with aspects of the present invention. Steps of the method may be carried out in the environment of FIGS. 4 and 5 and are described with reference to elements depicted in FIGS. 4 and 5. In embodiments, at step S610, a first processes of a service cluster (e.g., one of the processes running on one of the nodes 430, 440, 450, 460, 470 and 480) sets a first reset time T indicating the time at which the process will undergo a reset, i.e., self-healing, procedure. At step S620, the first process broadcasts the reset time T to the other processes of the service cluster by sending a one-way datagram to the other processes, the one-way datagram also including the service key ("SERVICE_KEY") identifying the process as being one of a cluster of processes. In embodiments, the SERVICE_KEY is a unique identified used to identify the service that must remain operational. At step S625, the first process enters the RUNNING state and operates as described with respect to FIG. 5.

At step S630, the first process, while in the running state, receives a datagram from another process. As described with respect to FIG. 5, the datagram from the other process includes a service key and a reset time T'. At step S630 the first process determines whether the service key received in the datagram at step S630 is the same service key as for the first process. If the service key in the received datagram is not the same as the service key for the first process, then the first process continues operating in the running state and eventually transitions to the shutting down state, as indicated at step S650. In aspects, the first process can repeat step S630 many times while in the running state, e.g., when it receives respective datagrams from other processes.

If at step S630 the service key is the same, then at step S640 the first process determines whether the reset time T' (received in the datagram at step S630) equals the reset time T (of the first process). If the reset time T' is not the same as the reset time T, then the first process continues operating in the running state and eventually transitions to the shutting down state, as indicated at step S650. In aspects, the first process can repeat step S630 many times while in the running state, e.g., when it receives respective datagrams from other processes.

If at step S640 the reset time T' is the same as the reset time T, then the method continues to step S680, at which the first process is prevented from shutting down and a new reset time for the first process is set via, for example, a randomized algorithm.

In embodiments, a second reset time T' is the same as (e.g., coincides with) a first reset time T when the first and second reset times are separated by a period of time ("PERIOD") that is equal to or smaller than the period of time typically necessary to shut down and restart the first process. In embodiments, the PERIOD is the general time frame in seconds within which a process should attempt to terminate and re-spawn. In embodiments, the first and second reset times are considered to "coincide" even if the first and second reset times differ by an amount of time that is greater than the PERIOD by a certain amount of time, referred to as a variance ("VARIANCE"). In embodiments, the VARIANCE is the accepted maximum variance, in seconds, of PERIOD that is allowed. In embodiments, the reset procedure of the process requires a given period of time ("PERIOD"), and during that period of time, if the second process also shuts down, a situation arises where both the first and second processes are shut down during the same period of time. Accordingly, by preventing the first process from shutting when the second process is about to shut down, the situation where both the first and second processes shut down for a same period of time is avoided, which allows the service cluster to continue to operate satisfactorily when individual processes undergo resetting, i.e., self-healing, cycles. In embodiments, as the first process is prevented from shutting down at step S680, the second process undergoes a shutdown/restart procedure at step S690. In embodiments, the shutting down the second process followed by restarting the second process constitutes self-healing of the second process.

In embodiments, if the second reset time of the second process does not coincide with the first reset time T of the first process, then at step S650 the first and second processes continue in their respective running states and eventually undergo their respective reset procedures at their respective reset times (unless either receives a datagram from another process that has the same service key and the same reset time). Accordingly, if the first reset time and the second reset time are separated by at least the minimum amount of time between the reset times of the first process and the second process ("PADDING"), then the first and second processes are considered to not coincide with each other. In embodiments, when the first and second processes independently shut down at their respective reset times, the first and second processes subsequently independently restart at step S660. In embodiments, independently shutting down each of the first and second processes at step S650 followed by independently restarting each of the first and processes at step S660 constitutes reset, i.e., self-healing of each of the first and second processes.

In embodiments, while in the RUNNING state, if the process receives the datagram from another process that has a SERVICE_KEY that matches the SERVICE_KEY of the process, the process determines whether the epoch within the datagram is within the PADDING in seconds of its own reset epoch, i.e., reset time, in which case the process does not undergo resetting and transitions to the TIMER_INIT state.

In embodiments, when a process enters the TIMER_INIT state, the process randomly generates a number N between the PERIOD−VARIANCE time and the PERIOD+VARIANCE time, and N represents the number of seconds until the process enters the SHUTTING_DOWN state. In embodiments, the reset time (e.g., T or T') is determined by adding N to the system epoch time. In embodiments, the process schedules a timer for N seconds to enter the SHUTTING_DOWN state, then transition to the RUNNING state.

In embodiments, when the process enters the SHUTTING_DOWN state, the process stops accepting new connections and, in responding to any connection requests, sets a flag so that all requests in progress at that point in time will append a "Connection: Close" header in the response. The process then sets a timer for TIME_OUT in seconds and transitions to the TIMED_OUT state when the reset time is reached. Once all connections are closed, the process enters the TERMINATED state.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
randomly generating, by a process running on a computer device, a first reset time for the process;
broadcasting, by the process, a first message to other processes in a cluster, the first message including the first reset time;
entering, by the process, a running state;
receiving, by the process, a second message from one of the other processes, the second message including a second reset time;
comparing, by the process, the second reset time to the first reset time; and
in response to the comparing, the process performs one of:
continuing in the running state based on the second reset time being different than the first reset time; and
randomly generating a new reset time for the process based on the second reset time coinciding with the first reset time.

2. The method of claim 1, further comprising the process re-entering the running state after randomly generating the new reset time.

3. The method of claim 1, wherein the running state is a state where the process handles incoming requests.

4. The method of claim 1, wherein:
the first message further includes a first service key, and the second message includes a second service key; and
the randomly generating the new reset time is performed only if the first service key is the same as the second service key.

5. The method of claim 1, further comprising, in response to one of the first reset time and the new reset time being reached, entering a shutting down state including shutting down the process and closing communications to the process.

6. The method of claim 1, wherein the randomly generating and the broadcasting are performed by the process in a timer initialization state.

7. The method of claim 1, wherein the broadcasting the first message to the other processes comprises sending a one-way datagram to the other processes.

8. The method of claim 1, wherein the second reset time being different than the first reset time comprises the second reset time being separated from the first reset time by a period of time that is greater than a reset period of the process.

9. The method of claim 1, wherein the computer device includes software provided as a service in a cloud environment.

10. A computer program product, the computer program product comprising a computer readable storage medium having program instructions embodied therewith, the program instructions executable by a computer device to cause a process running on the computer device to:
randomly generate a first reset time for the process;
broadcast a first message to other processes in a cluster, the first message including the first reset time;
enter a running state;
receive a second message from one of the other processes, the second message including a second reset time;
compare the second reset time to the first reset time; and
in response to the comparing, causing the computer device to one of:
continue in the running state based on the second reset time being different than the first reset time; and
randomly generate a new reset time for the process based on the second reset time coinciding with the first reset time.

11. The computer program product of claim 10, wherein the process re-enter the running state after the new reset time for the process is randomly generated.

12. The computer program product of claim 10, wherein the running state is a state where the process handles incoming requests.

13. The computer program product of claim 10, wherein:
the first message further includes a first service key, and the second message includes a second service key; and
the randomly generating the new reset time is performed only if the first service key is the same as the second service key.

14. The computer program product of claim 10, wherein the program instructions further cause the process running on the computer device to, in response to one of the first reset time and the new reset time being reached, enter a shutting down state including shutting down the process and closing communications to the process.

15. A system comprising:
a processor, a computer readable memory, and a computer readable storage medium;
program instructions to randomly generate a first reset time for a process;

program instructions to broadcast a first message to other processes in a cluster, the first message including the first reset time;

program instructions to enter a running state;

program instructions to receive a second message from one of the other processes, the second message including a second reset time;

program instructions to compare the second reset time to the first reset time; and program instructions to, in response to the comparing, cause the process to one of:

continue in the running state based on the second reset time being different than the first reset time;

randomly generate a new reset time for the process based on the second reset time coinciding with the first reset time;

wherein the program instructions are stored on the computer readable storage medium for execution by the processor via the computer readable memory.

16. The system of claim 15, further comprising program instructions to re-enter the running state after the randomly generating the new reset time.

17. The system of claim 15, wherein, in the running state, the process handles incoming requests.

18. The system of claim 15, wherein:

the first message further includes a first service key, and the second message includes a second service key; and the randomly generating the new reset time is performed only if the first service key is the same as the second service key.

19. The system of claim 15, further comprising program instructions to, in response to one of the first reset time and the new reset time being reached, enter a shutting down state including shutting down the process and closing communications to the process.

20. The system of claim 15, wherein the first reset time and the second reset time coinciding comprises the first reset time and the second reset time having a difference that is less than a reset period of the process.

* * * * *